(12) United States Patent
Reid et al.

(10) Patent No.: US 11,159,407 B2
(45) Date of Patent: Oct. 26, 2021

(54) DETECTION OF UNAUTHORIZED CRYPTOMINING

(71) Applicant: AT&T Intellectual Property I, L.P., Atlanta, GA (US)

(72) Inventors: Dylan Reid, Atlanta, GA (US); Joseph Soryal, Ridgewood, NY (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 9 days.

(21) Appl. No.: 16/601,677

(22) Filed: Oct. 15, 2019

(65) Prior Publication Data
US 2021/0111979 A1 Apr. 15, 2021

(51) Int. Cl.
| | | |
|---|---|---|
| G06F 15/173 | (2006.01) | |
| H04L 12/26 | (2006.01) | |
| H04L 12/911 | (2013.01) | |
| H04L 12/729 | (2013.01) | |
| H04L 9/08 | (2006.01) | |
| H04L 9/06 | (2006.01) | |

(52) U.S. Cl.
CPC ........ H04L 43/0876 (2013.01); H04L 9/0643 (2013.01); H04L 9/088 (2013.01); H04L 9/0819 (2013.01); H04L 45/125 (2013.01); H04L 47/72 (2013.01); H04L 2209/38 (2013.01)

(58) Field of Classification Search
CPC . H04L 43/0876; H04L 9/0643; H04L 9/0819; H04L 9/088; H04L 45/125; H04L 47/72; H04L 2209/38
See application file for complete search history.

(56) References Cited

U.S. PATENT DOCUMENTS

| | | | | |
|---|---|---|---|---|
| 7,519,726 B2* | 4/2009 | Palliyil | ............... | G06F 16/9014 709/232 |
| 9,160,539 B1* | 10/2015 | Juels | ..................... | G06F 21/554 |
| 2006/0123224 A1* | 6/2006 | Klug | ................... | H04L 63/0428 713/150 |

(Continued)

OTHER PUBLICATIONS

Papadopoulos, Panagiotis & Ilia, Panagiotis & Markatos, Evangelos. (2018). Truth in Web Mining: Measuring the Profitability and Cost of Cryptominers as a Web Monetization Model. 17 pages. https://arxiv.org/pdf/1806.01994.pdf.

(Continued)

*Primary Examiner* — Razu A Miah

(57) ABSTRACT

A processing system of a device having at least one processor may determine that a temperature of the device exceeds a threshold temperature and obtain, in response to the determining, utilization information of the device comprising: processor utilization information, memory utilization information, and network utilization information. The processing system may then detect, from the utilization information of the device, a pattern comprising: a first network utilization burst, a processor utilization exceeding a processor utilization threshold and a memory utilization exceeding a memory utilization threshold over at least a designated period of time following the first network utilization burst, and a second network utilization burst after at least the designated period of time. When the pattern is detected, the processing system may generate an unauthorized cryptomining alert.

20 Claims, 3 Drawing Sheets

(56) References Cited

U.S. PATENT DOCUMENTS

| | | | | |
|---|---|---|---|---|
| 2009/0290550 | A1* | 11/2009 | Bhattad | H04L 5/0073 370/329 |
| 2010/0169039 | A1* | 7/2010 | Hosokawa | G06F 1/206 702/136 |
| 2010/0217837 | A1* | 8/2010 | Ansari | H04L 67/16 709/218 |
| 2010/0271956 | A1* | 10/2010 | Diwakar | G06F 11/3452 370/242 |
| 2011/0235518 | A1* | 9/2011 | Halabi | H04L 47/30 370/237 |
| 2013/0185561 | A1* | 7/2013 | Brusilovsky | H04L 9/0866 713/170 |
| 2015/0057830 | A1* | 2/2015 | Slaby | G06F 1/324 700/300 |
| 2015/0074259 | A1* | 3/2015 | Ansari | H04L 67/02 709/224 |
| 2017/0085413 | A1* | 3/2017 | Cencini | H04L 41/044 |
| 2017/0118229 | A1* | 4/2017 | Chen | H04W 12/128 |
| 2017/0141926 | A1* | 5/2017 | Xu | H04L 9/3263 |
| 2017/0364702 | A1* | 12/2017 | Goldfarb | H04L 63/14 |
| 2018/0026906 | A1* | 1/2018 | Balle | G06F 3/0673 709/226 |
| 2018/0026913 | A1* | 1/2018 | Balle | G06F 9/544 709/226 |
| 2018/0027066 | A1* | 1/2018 | Van De Groenendaal | G06F 3/0688 709/226 |
| 2019/0339688 | A1* | 11/2019 | Celia | G05B 19/41865 |
| 2019/0392468 | A1* | 12/2019 | Stanciu | G06Q 30/0207 |
| 2020/0053109 | A1* | 2/2020 | Lancioni | G06F 11/3006 |
| 2020/0175155 | A1* | 6/2020 | Bhamidipati | H04L 9/3239 |
| 2020/0235924 | A1* | 7/2020 | Monica | H04L 9/0894 |
| 2020/0236085 | A1* | 7/2020 | Spurlock | G06F 11/3006 |
| 2020/0387597 | A1* | 12/2020 | Karasev | G06F 21/52 |

OTHER PUBLICATIONS

Dashevskyi, Stanislav & Zhauniarovich, Yury & Gadyatskaya, Olga & Pilgun, Aleksandr & Ouhssain, Hamza. (2020). Dissecting Android Cryptocurrency Miners. pp. 191-202. https://arxiv.org/pdf/1905.02602.pdf.

Holmes, David. Feb. 2018. Avoid Becoming a Crypto-Mining Bot: Where to Look for Mining Malware and How to Respond. 3 pages. https://www.securityweek.com/avoid-becoming-crypto-mining-bot-where-look-mining-malware-and-how-respond.

Bocetta, Samuel. Feb. 2019. So Long, Ransomware: Organizations Brace for Cryptojacking. Dataversity. 3 pages. https://www.dataversity.net/so-long-ransomware-organizations-brace-for-cryptojacking/#.

Delaney, Darragh. May 2018. How to Detect Cryptocurrency Mining Activity on Your Network. Netfort. 3 pages. https://www.netfort.com/blog/detect-cryptocurrency-mining-activity/.

* cited by examiner

DETECTION OF UNAUTHORIZED CRYPTOMINING

The present disclosure relates generally to non-permitted use of computing resources for cryptomining activities, and more particularly to methods, computer-readable media, and devices for generating an unauthorized cryptomining alert.

BACKGROUND

Cryptographic mining, or cryptomining, involves solving complex mathematical problems and is a key component of blockchain technologies. Primarily due to the financial incentives of many blockchain schemes, hackers, without authorization or consent, may commandeer computers and servers to remotely to perform these exhaustive computational tasks without the knowledge or approval of the devices' owners.

SUMMARY

In one example, the present disclosure describes a method, computer-readable medium, and apparatus for generating an unauthorized cryptomining alert. For example, a processing system of a device having at least one processor may determine that a temperature of the device exceeds a threshold temperature and obtain, in response to the determining, utilization information of the device comprising: processor utilization information, memory utilization information, and network utilization information. The processing system may then detect, from the utilization information of the device, a pattern comprising: a first network utilization burst, a processor utilization exceeding a processor utilization threshold and a memory utilization exceeding a memory utilization threshold over at least a designated period of time following first the network utilization burst, and a second network utilization burst after at least the designated period of time. When the pattern is detected, the processing system may generate an unauthorized cryptomining alert.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
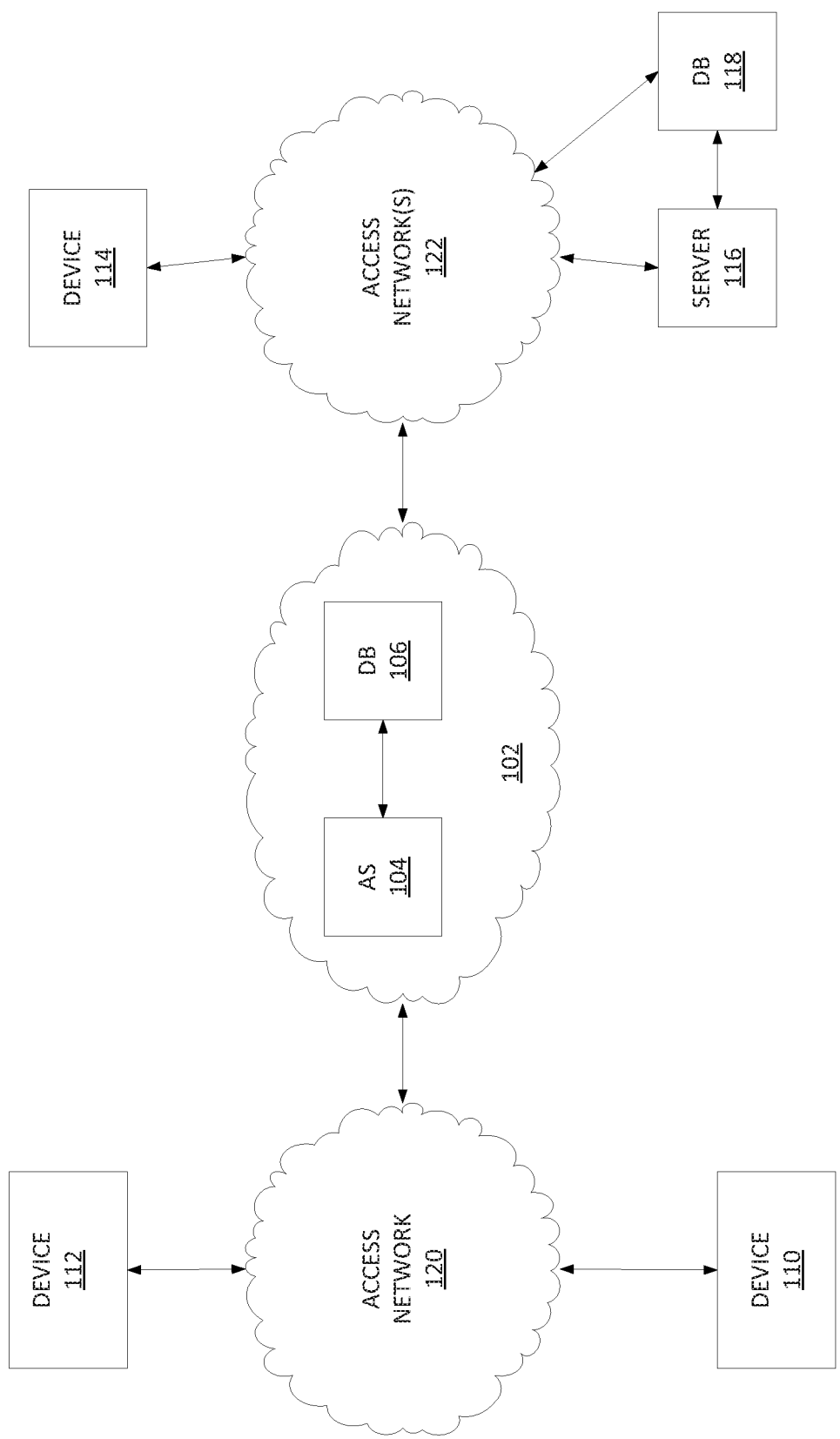
FIG. 1 illustrates an example network related to the present disclosure.

Cryptographic mining, or cryptomining, involves solving complex mathematical problems and is a key component of blockchain technologies. Primarily due to the financial incentives of many blockchain schemes, hackers, without authorization or consent, may commandeer computers and servers to remotely to perform these exhaustive computational tasks without the knowledge or approval of the device owners. These operations consume processor resources, memory resources, and electricity, which is costly to the device owners.

Examples of the present disclosure provide for methods, computer-readable media, and devices for generating an unauthorized cryptomining alert. In one example, the present disclosure may comprise a service implemented by a processing system of the device that may be embedded on top of a device operating system (OS) as an installable application with certain privileged accesses, and that may monitor the following upon being activated: processor usage (e.g., central processing unit (CPU) usage, graphics processing unit (GPU) usage, etc.), memory usage, and network activity (e.g., network interface card (NIC) usage). In one example, the service (which may be referred to herein as an "unauthorized cryptomining detection service") may also monitor the device temperature, e.g., via a heat sensor integrated with the device, in communication with the device, or otherwise accessible to the device. In one example, the service may be configurable to be installed on any node type (e.g., servers, personal computers, mobile computing devices, Internet of Things (IoT) devices, etc.) and may comprise modules with different specifications based on the installed environment (e.g., local directories, processor speed, constantly running applications, etc.).

In one example, the unauthorized cryptomining detection service may monitor user activity via a user interface and/or one or more peripheral devices, such as keyboard usage, mouse usage, etc., and may also monitor scheduled operations. In addition, the user activity and scheduled operations may be correlated to processor, memory, and network usages. For example, if a web application is requested (https), corresponding traffic would be expected in the NIC. Otherwise, traffic may be analyzed at the NIC to see where the packets are heading locally and what is being sent remotely.

In one example, the unauthorized cryptomining detection service may calculate the usage of the elements described above separately from a native task manager installed on a device. In one example, the service may be activated periodically (e.g., once every five minutes, once every ten minutes, etc.). In another example, the service may be activated by sensing excessive heat (excessive heat is a strong evidence of exhaustive computing) and/or out-of-ordinary sensed resource consumption of processor and/or memory resources. In one example, the service may calculate the above stated parameters for locally running applications (whitelisted by the service) and then compare these results to the usage calculated by a device task manager process. If one or more discrepancies are detected that exceed a respective threshold deviation, the service may generate an alarm.

In one example, the unauthorized cryptomining detection service may operate to first determine that a temperature of the device exceeds a threshold temperature. In one example, the service may account for a difference between the device temperature and an ambient or outside temperature (since device temperature alone may be insufficient to indicate excessive heat, depending upon the ambient temperature around the device). In response to this detection, the service may then obtain utilization information of the device comprising: processor utilization information, memory utilization information, and network utilization information. The service may correlate the utilization information to detect a pattern that is indicative of cryptomining. For instance, the pattern may comprise a first network utilization burst, a processor utilization exceeding a processor utilization threshold and a memory utilization exceeding a memory utilization threshold over at least a designated period of time following the network utilization burst, and a second network utilization burst after at least the designated period of time.

To illustrate, cryptomining may involve an initial key exchange between the device and a remote device that is controlling the unauthorized cryptomining activity, which may be indicated in the network utilization information. In addition, cryptomining involves solving a complex puzzle with high frequency of computation (with no input or minimal input). Thus, an unauthorized cryptomining process may run for several minutes, 30 minutes, up to one hour or more, etc. without additional input. For example, there may be only one small command to a CPU or GPU to initiate the process. A high processor utilization and memory utilization is characteristic of the period that follows. Upon completion of the mathematical computations, there may be a burst of network activity to upload a result, or results to a remote device that is controlling the unauthorized cryptomining process (and/or to one or more other devices associated therewith). When such a pattern is detected, the unauthorized cryptomining detection service may generate an alert, which may comprise a visual warning message via a display of the device or via one or more indicator lights of the device, a message to a remote device (e.g., a text message, an email message, etc.), an audible alert, and so forth.

In one example, the unauthorized cryptomining detection service may detect the pattern and generate the alert based upon overall device utilization metrics. Alternatively, or in addition, the unauthorized cryptomining detection service may detect the pattern and generate the alert with respect to utilization metrics of a particular process, or a set of processes and/or threads. In one example, the unauthorized cryptomining detection service may perform a two-layered process to detect a first pattern with regard to the overall device utilization metrics, and to detect a second pattern (which may have similar overall characteristics, but with different thresholds) with regard to a particular process from among a plurality of running and/or active processes of the device. In such case, there may be different thresholds for the utilization metrics applied to detect the pattern with regard to the overall device utilization metrics as compared to utilization metrics that are specific to a given process.

In one example, the unauthorized cryptomining detection service may also verify that the pattern(s) correspond(s) to unauthorized cryptomining activity by performing a more detailed scan of the device, such as determining a number of hashing operations of the process exceeds a threshold number of hashing operations within the designated time period, detecting that the process attempts to reserve excess processor and/or memory resources exclusively for itself, verifying that the first network utilization burst comprises a key exchange with a remote device, and so forth.

The unauthorized cryptomining detection service may alternatively or additionally verify that local applications running on the device are not associated with an unauthorized remote device, process, and/or application. The service may also provide a configuration option that a user may select to lock down the NIC so no traffic is being sent or received (e.g., in off hours). In one example, expected and authorized remote applications running on the local device may be registered with the service in order that such services are not flagged as being associated with potential unauthorized cryptomining. As an example, a user workstation may access a server to perform legitimate computations. Activities of this nature and the associated applications may therefore be whitelisted with the service.

In one example, the unauthorized cryptomining detection service may also scan the device for remote connections being utilized by unauthorized installed programs. In addition, in one example, the service may communicate with one or more other devices over one or more networks (e.g., over the Internet) to search for executables and/or code signatures of known cryptomining applications/processes (e.g., a miner executable). The service may utilize this information in conjunction with additional techniques described herein, and may scan the device periodically or upon detecting unusual behavior/usage. The service may also learn patterns of normal resource consumption through machine learning (ML) processes to develop deviation thresholds for various metrics.

In addition to the normal cryptomining behaviors that utilize significant/observable processor resources, there is stealthy, unauthorized cryptomining where malware attempts to utilize an undetectable fraction of the processor resources. To detect this type of cryptomining, the unauthorized cryptomining detection service may: monitor the NIC for periodic small transmissions to a remote host (e.g., identified by a destination IP address) that is not related to any of the running processes, monitor the memory for any continuous periodic writing to the memory that is not generated from an authorized processes (to protect against writing results and send them in larger chunks to avoid continuous transmission detection), monitor for unauthorized remote connections that attempt to colonize or take control of segments of the device's resources, and monitor and detect excessive and unnecessary use of hashing function(s) (e.g., watch for hashing processes being used, such as SHA2).

The unauthorized cryptomining detection service may perform further investigation (e.g., upon initial cryptomining pattern detection as described above) to see if the processor resources of the device are performing any process on distributed ledger data, such as a blockchain string (e.g., low level inspection may detect a distributed ledger which includes the same information format/fields repeated over and over, such as dates, transactions, owners, values, etc.).

As a result of solving systematic mathematical equations, a cryptomining process may also generate a continuous output or nearly continuous output for pieces of data (hashes) equal in size or similar in size (the hash may be padded to avoid detection). For instance, the results of the mathematical computations may be generated by the CPU(s)/GPU(s) on continuous basis and may be shipped out directly or may be stored in memory and sent out in blocks to avoid normal mining behavior detection. Notably, a device engaged in cryptomining may output hashes at a rate of megahashes per second (MH/s). In addition, solving systematic mathematical equations provides a detectable pattern of processor usage intervals, which may comprise numerous, continuous/adjacent spikes of similar magnitude for prolonged periods.

At various times (e.g., periodically) the unauthorized cryptomining detection service may inspect the authorized processes running on the device. In addition, the unauthorized cryptomining detection service may simulate the running processes inside a makeshift local temporary container (e.g., on the same device) and compare the levels of resource usage (processor, NIC, memory) to the reported resource consumption/usage levels. Over time, a machine learning (ML) module implemented by the processing system may learn the approximate correlation between the running processes under different conditions (e.g., loads) and resource usage levels. If the unauthorized cryptomining detection service finds the resource usage exceeds the expected resource usage calculated via the ML module (with respect to one or more of the parameters of processor, NIC, and/or memory usage), then the processing system may perform a more detailed investigation, such as monitoring processor actions, calculations, and/or results, tracing back to processes, and checking if these processes are authorized processes.

As referred to herein, a machine learning model (MLM) (or machine learning (ML)-based model) may comprise a machine learning algorithm (MLA) that has been "trained" or configured in accordance with input data (e.g., training data) to perform a particular service, e.g., to detect speech or other utterances in audio content, to identify words and phrases in speech and to convert to text, to identify intents and entities in natural language, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, such as deep neural networks (DNNs), decision tree algorithms/models, k-nearest neighbor (KNN) clustering algorithms/models, hidden Markov models (HMMs), conditional random fields (CRF) models, generative adversarial networks (GANs), and so forth.

In the present disclosure, the ML module may train a MLA to generate a MLM that is configured to detect a pattern indicative of unauthorized cryptomining. For instance, a set of input data may comprise positive examples of utilization metrics associated with cryptomining and negative examples of utilization metrics associated with normal usage (e.g., usage without cryptomining). In one example, the utilization metrics associated with cryptomining may be captured from a test environment where one or more devices are purposefully infected with one or more known unauthorized cryptomining applications. In another example, the utilization metrics associated with cryptomining may be captured from devices operating generally benign cryptomining applications (where it may be assumed that the device utilization is similar, regardless of whether the cryptomining is authorized or unauthorized). The MLA may then be trained to provide a MLM that is configured to distinguish between a "normal" state, and a patterns of device utilization metrics that are indicative of unauthorized cryptomining.

In one example, the MLM may provide a confidence score regarding a prediction that the device is engaged in unauthorized cryptomining. For instance, if the MLM is a SVM-based model, a set of utilization metrics may be characterized as a vector in a hyperspace, where a separation hyperplane may distinguish between a "normal" state and unauthorized cryptomining. When the vector is on a side of the separation hyperplane that is indicative of unauthorized cryptomining, an alert may be generated. In addition, the confidence score may comprise a distance (e.g., a Euclidean distance within the hyperspace) of the vector to the separation hyperplane. A greater distance may indicate a greater confidence that the pattern is associated with unauthorized cryptomining and hence may result in the output of a greater confidence score. In other examples, a confidence score may be determined in a different manner, e.g., depending upon the particular type of MLM that is implemented.

In one example, the unauthorized cryptomining detection service, via the ML module, may also correlate a number of authorized processes running on the device with average electricity usage (recent advanced servers may accurately track power consumption); any higher consumption may indicate hidden programs are running and may result in the processing system generating an alarm. In one example, the detection of electricity usage that exceeds a threshold may be used as an alternative or in addition to the mechanism of a device temperature threshold being used to initiate the unauthorized cryptomining detection service. For instance, the device heat may be suppressed at certain times, such as overnight hours in an office building when the ambient temperature may drop. However, the electricity usage may still exhibit a spike that may be detected by the device in question. In one example, both device temperature and electricity usage may be utilized for redundancy.

As stated above, in one example, the unauthorized cryptomining detection service may assign a score, e.g., with confidence intervals, for the "likelihood that an unauthorized cryptomining program is running." For instance, in one example, any score above a threshold, such as above 50%, above 60%, etc., may generate an alarm. The alarm may include one or more of: a screen message on the device, noises, light activations (e.g., a blinking light on the device), text messages, emails, or other messages to one or more remote devices, and so forth. In one example, for scores exceeding a second threshold (e.g., above 80% above 90%, etc.) and/or with a confidence score exceeding a confidence threshold (e.g., above 80%, above 90%, etc.) alarms/messages may be generated for at least two authorized users or entities, both, all, and/or a majority of which may be required to acknowledge the alarms/messages in order to shut off the warnings. Otherwise, the unauthorized cryptomining detection service may keep generating alarms with higher rates. For instance, this step may protect against the possibility that an inside person is responsible for or complicit with the unauthorized cryptomining activity. In addition, there may be a greater likelihood that the unauthorized activity is addressed quickly. Depending on the initial configuration, scores below the second threshold (e.g., below 80%, below 90%, etc.) may be shut off (reset) by one person/entity. These and other aspects of the present disclosure are described in greater detail below in connection with the examples of FIGS. 1-3.

To further aid in understanding the present disclosure, FIG. 1 illustrates an example system 100 in which examples of the present disclosure for generating an unauthorized cryptomining alert may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a core network 102. The core network 102 may be in communication with one or more access networks 120 and 122, and the Internet (not shown). In one example, core network 102 may combine core network components of a cellular network with components of a triple play service network; where triple-play services include telephone services, Internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may further comprise a broadcast television network, e.g., a traditional cable provider network or an Internet Protocol Television (IPTV) network, as well as an Internet Service Provider (ISP) network. In one example, core network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of core network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the core network 102 may be operated by a telecommunication network service provider. The core network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114. Access networks 120 and 122 may transmit and receive communications between devices 110, 112, and 114, between devices 110, 112, and 114, and server 116 and/or database (DB) 118, application server (AS) 104 and/or database (DB) 106, other components of core network 102, devices reachable via the Internet in general, and so forth. In one example, each of the devices 110, 112, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like. In one example, any one or more of devices 110, 112, and 114 may each comprise programs, logic or instructions for generating an unauthorized cryptomining alert as described herein. For example, devices 110, 112, and/or 114 may each comprise a computing system or device, such as computing system 300 depicted in FIG. 3, and may be configured to provide one or more operations or functions for generating an unauthorized cryptomining alert.

Figure 3:
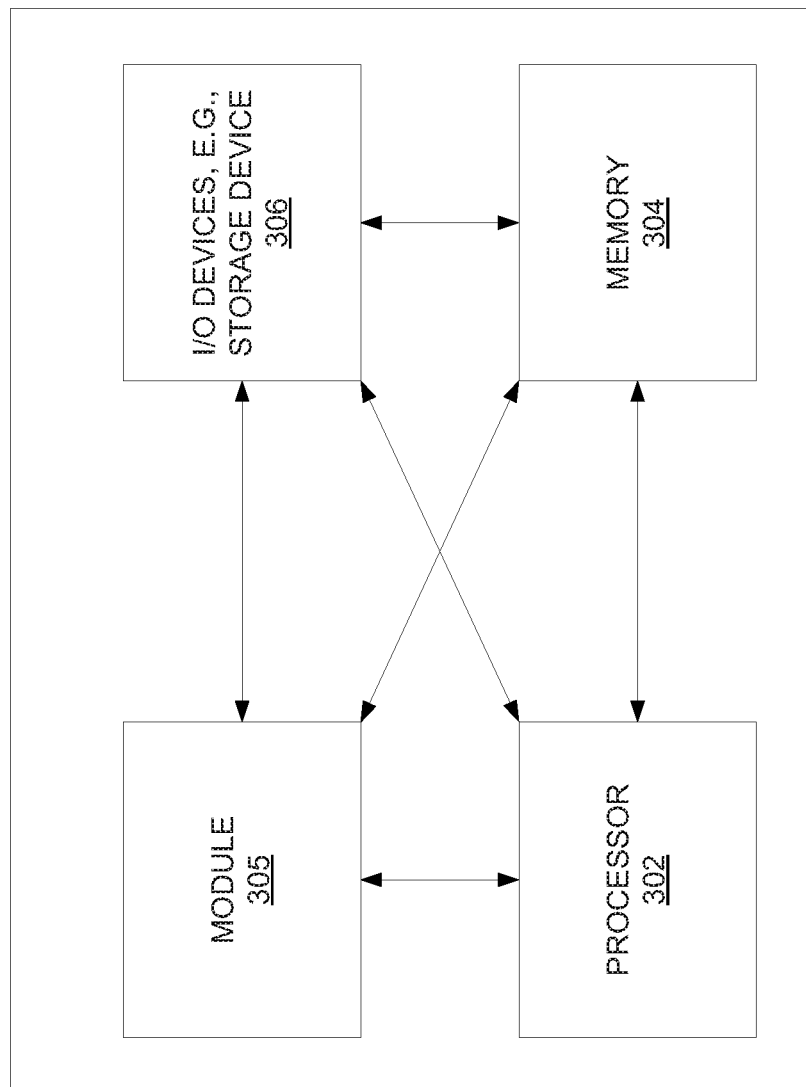
FIG. 3 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

To illustrate, device 110 may comprise an enterprise server with significant computing resources for providing various computing services to a large organization, e.g., a national bank, a hospital network, a university, etc. Accordingly, device 110 may comprise a high value target for a bad actor intent upon exploiting the computing resources of device 110 for unauthorized cryptomining. For instance, the bad actor may utilize device 114 to initiate an attack on device 110 over one or more networks and may gain access to device 110 to install and run an unauthorized cryptomining application (e.g., as one or more running processes). It should be noted that the unauthorized cryptomining application may be configured to attempt to hide the presence of the unauthorized cryptomining application and its activities from device 110 and/or an operator thereof using any one or more techniques for evading detection by antivirus software, or the like. For instance, the unauthorized cryptomining application may attempt to run as one or more hidden processes, may install itself in file locations and may utilize file names and extensions that may attempt to appear as ordinary files and/or as other legitimate files, and so forth. Alternatively, or in addition, the unauthorized cryptomining application may comprise a publicly available application that may be used for legitimate purposes in other circumstances, but which are simply installed and operating on device 110 without proper authorization.

In any case, the unauthorized cryptomining application may instantiate processes to engage in cryptomining operations which may result in significant electricity usage and cost, increased device heat, and increased processor and memory utilizations. In one example, unauthorized cryptomining may involve commands from a remote server to initiate the unauthorized cryptomining. Thus, for example, there may be network traffic between device 110 and device 114. Initially, the network traffic may involve a key exchange followed by device 114 loading device 110 with instructions and other information relating to a cryptographic puzzle (e.g., a hash puzzle) to be solved. Thereafter, the unauthorized cryptomining application (e.g., the one or more running processes and/or threads thereof) may cause significant processor and memory resources to be occupied for an extended period of time (e.g., at least five minutes, at least 10 minutes, at least 30 minutes, or more than one hour) while solving the cryptographic puzzle(s). In one example, the unauthorized cryptomining application operating on device 110 may be controlled by device 114 to solve multiple cryptographic puzzles, e.g., back-to-back or in parallel via different CPUs/cores, different GPUs, different sets of memory resources, etc. Following, the completion of task relating to solving one or more cryptographic puzzles, the unauthorized cryptomining application may need to upload the results to device 114. In one example, the unauthorized cryptomining application may store multiple results and may offload the results at a later time. For instance, this may comprise an attempt to avoid detection. In another example, the unauthorized cryptomining application may await a query or instruction from device 114 in response to which the results may be transmitted to device 114.

In accordance with the present disclosure, the unauthorized cryptomining may generate a specific pattern that may be recognized by an unauthorized cryptomining detection service running on device 110. For instance, the pattern many comprise: a first network utilization burst, a processor utilization exceeding a processor utilization threshold and a memory utilization exceeding a memory utilization threshold over at least a designated period of time following the first network utilization burst, and a second network utilization burst after at least the designated period of time. In one example, since unauthorized cryptomining is generally associated with elevated device heat levels, the device 110 may initially monitor for the device temperature exceeding a threshold, upon which the unauthorized cryptomining detection service may be activated to perform pattern detection. For example, the unauthorized cryptomining detection service may obtain utilization information of the device comprising: processor utilization information, memory utilization information, and network utilization information, and may detect the pattern comprising the first network utilization burst, the processor utilization exceeding a processor utilization threshold and the memory utilization exceeding a memory utilization threshold over at least a designated period of time following the first network utilization burst, and the second network utilization burst after at least the designated period of time.

In one example, the unauthorized cryptomining detection service may detect the pattern and generate the alert based upon overall device utilization metrics. Alternatively, or in addition, the unauthorized cryptomining detection service may detect the pattern and generate the alert with respect to utilization metrics of a particular process, or a set of processes and/or threads. In one example, the unauthorized cryptomining detection service may perform a two-layered process to detect a first pattern with regard to the overall device utilization metrics, and to detect a second pattern with regard to a particular process from among a plurality of running and/or active processes of the device. In one example, the pattern detection may be followed with confirmation via low-level inspection prior to generating an alert. The low-level inspection may comprise determining whether the processor resources of the device are performing any process on distributed ledger data, such as a blockchain string, determining a number of hashing operations of the process exceeds a threshold number of hashing operations within the designated time period, detecting that the process attempts to reserve excess processor and/or memory resources exclusively for itself, verifying that the first network utilization burst comprises a key exchange with a remote device, and so forth.

The alert may be presented audibly or visually via device 110. Alternatively, or in addition, the alert may be sent to one or more other devices, such as device 112. For instance, device 112 may be associated with a network administrator responsible for device 110.

In one example, the unauthorized cryptomining detection service operating on device 110 may include a machine learning (ML) component that may learn different resource consumption patterns for different device loads (e.g., different numbers of running processes, various combinations of running processes, number of concurrent logged in users, etc.) and for different time periods. As such, device 110 may set the various thresholds, and the pattern may be based upon the typical resource consumption patterns. For instance, typical processor utilizations and/or ranges of processor utilizations, and typical memory utilizations and/or ranges of memory utilizations for different numbers of running processes, different combinations of running processes, different times of the day, days of the week, etc. may be learned by the device 110 such that thresholds comprising certain percentage deviations from such values or ranges of values may be implemented to detect a pattern indicative of unauthorized cryptomining on device 110.

Alternatively, or in addition, unauthorized cryptomining detection service operating on device 110 may communicate with a network-based processing system, e.g., comprising server 116 and DB 118 and/or AS 104 and DB 106, which may collect utilization information of various devices and of various device types to develop patterns for detecting unauthorized cryptomining on the respective devices and/or device types. For example, thresholds for detecting a pattern indicative of unauthorized cryptomining on a first device type may be based upon utilization information obtained from a plurality of devices of the first device type, whereas thresholds for detecting a pattern indicative of unauthorized cryptomining on a second device type may be based upon utilization information obtained from a plurality of devices of the second device type.

In this regard, the access networks 122 may also be in communication with a server 116 and a database (DB) 118. In accordance with the present disclosure, server 116 may comprise a computing system or server, such as computing system 300 depicted in FIG. 3, and may be configured to provide one or more operations or functions for generating an unauthorized cryptomining alert, as described herein. In one example, DB 118 may comprise a physical storage device integrated with server 116 (e.g., a database server), or attached or coupled to the server 116, to store various types of information in support of systems for generating an unauthorized cryptomining alert, in accordance with the present disclosure. For example, DB 118 may store executables and/or code signatures of known cryptomining applications/processes (e.g., miner executable). In addition, DB 118 may store patterns for detecting unauthorized cryptomining from device utilization information (e.g., heat thresholds, processor and/or memory utilization thresholds, network utilization timing thresholds, and so forth).

In one example, the patterns may be specific to particular devices or device types. For instance, one type of personal computer may generally run hotter than another type of personal computer. As such, the temperature thresholds may be different for these different device types. Similarly, in one example the typical usage of one device of the same type may different from another. For instance, two users may have a same laptop computer. However, one of the users may primarily use his or her laptop computer on the lap, which may block one or more cooling fans, while the other user may primarily use his or her laptop on a table, which may not have the same type of obstruction. In one example, server 116 may monitor various devices of one or more device types to learn over time these various patterns and to set the respective thresholds for detecting excessive heat, for detecting the pattern that is indicative of unauthorized cryptomining, and so forth.

In one example, the typical (e.g., average or median) utilization metrics for specific devices may be compiled by the server 116 and stored in DB 118, such as the average device heat, the average CPU utilization, the average memory utilization, the average NIC utilization, etc. For instance, devices, such as devices 110, 112, 114, etc. may report utilization metrics to server 116. These typical utilization metrics may also be stored arranged by date and time (e.g., weekdays, weekends, morning, afternoon, evening, overnight, etc., particular hours, holidays, and so forth). In one example, server 116 may include a machine learning (ML) component (e.g., an ML module) that may learn different resource consumption patterns for different device loads (e.g., different numbers of running processes, various combinations of running processes, number of concurrent logged in users, etc.) and for different time periods.

In one example, server 116 may process requests from various devices, such as devices 110, 112, and/or 114, for patterns indicative of unauthorized cryptomining (e.g., patterns that are specific to the respective devices and/or device types), for executables and/or code signatures of known cryptomining applications/processes, and so forth. In one example, DB 118 may also store programs, logic, or instructions that may be executed by server 116 for processing such requests. For instance, server 116 and DB 118 may comprise part of a system for generating an unauthorized cryptomining alert, and may alternatively or additionally provide a service to subscribing devices in connection with detecting and generating alerts for unauthorized cryptomining, in accordance with the present disclosure.

Figure 2:
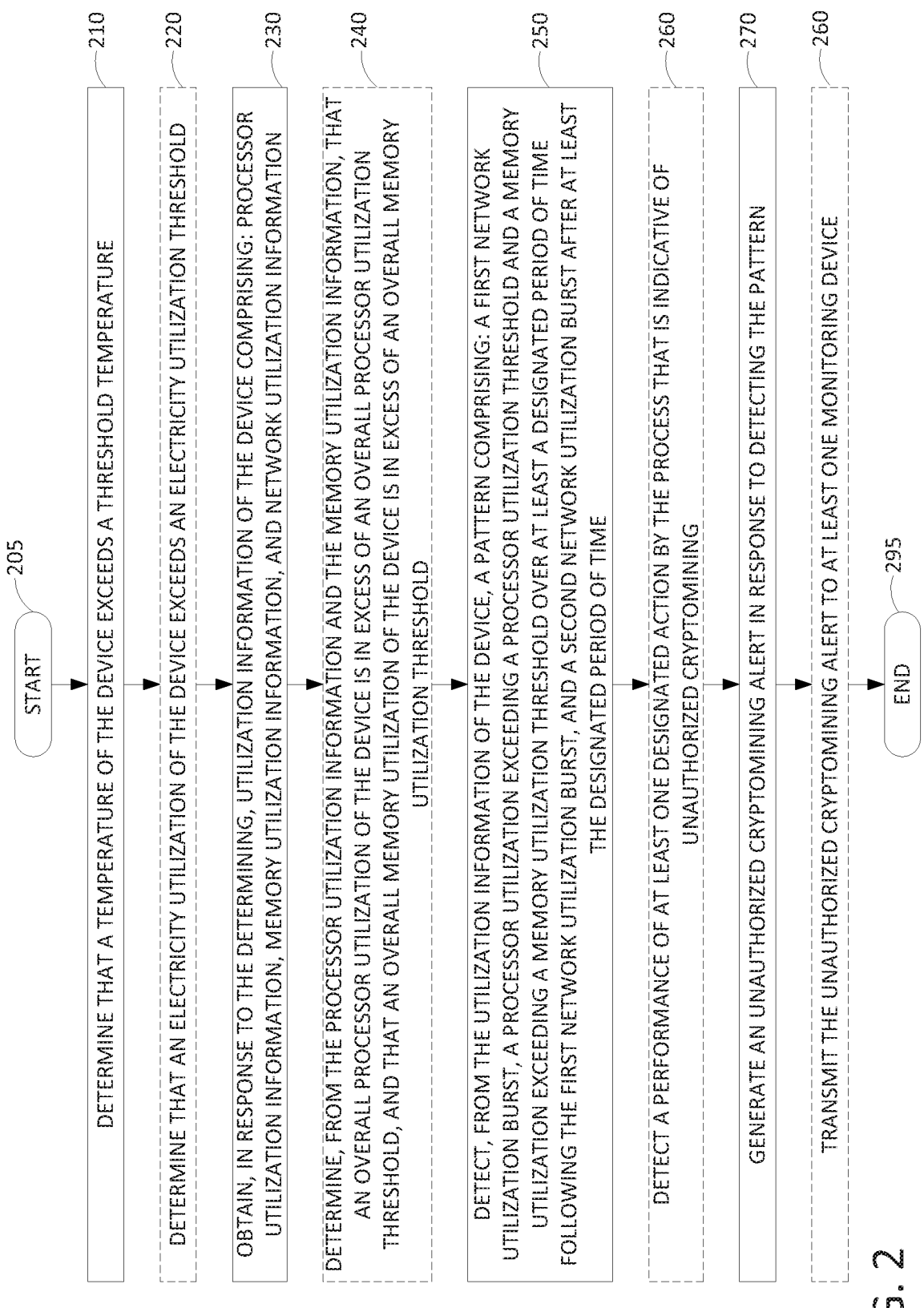
FIG. 2 illustrates a flowchart of an example method for generating an unauthorized cryptomining alert.

In addition, in one example, server 116 may perform operations of the method 200 of FIG. 2 to detect and generate alerts for unauthorized cryptomining which may be taking place on server 116. In other words, server 116 may itself become compromised and may be coopted into performing unauthorized cryptomining, which may be detected via the techniques described herein.

Although only a single server 116 and a single DB 118 are illustrated, it should be noted that any number of servers 116 or databases 118 may be deployed. In one example, core network 102 may also include an application server (AS) 104 and a database (DB) 106. In one example, AS 104 may perform the same or similar functions as server 116. Similarly, DB 106 may store the same or similar information as DB 118 (e.g., patterns indicative of unauthorized cryptomining, executables and/or code signatures of known cryptomining applications/processes, etc., programs, logic, or instructions that may be executed by AS 104 and/or server 116 for generating an unauthorized cryptomining alert, and so forth). For instance, core network 102 may provide a service to subscribing devices in connection with detecting and generating alerts for unauthorized cryptomining, e.g., in addition to television, phone, and/or other telecommunication services. In one example, AS 104, DB 106, server 116, and/or DB 118, or any one or more of such devices in conjunction with one or more of devices 110, 112, and/or 114, may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of core network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with core network 102 independently or in a chained manner. For example, device 114 and server 116 may access core network 102 via different access networks, devices 110 and 112 may access core network 102 via different access networks, and so forth. Thus, these and other modifications are all contemplated within the scope of the present disclosure.

FIG. 2 illustrates a flowchart of an example method 200 for generating an unauthorized cryptomining alert, in accordance with the present disclosure. In one example, the method 200 is performed by a component of the system 100 of FIG. 1, such as by one of devices 110, 112, or 114, the server 116, or application server 104, and/or any one or more components thereof (e.g., a processor, or processors, performing operations stored in and loaded from a memory), by a plurality of the devices 110, 112, or 114, server 116, or application server 104, or by any one or more of such devices in conjunction with one or more other devices, such as DB 106, DB 118, and so forth. In one example, the steps, functions, or operations of method 200 may be performed by a computing device or system 300, and/or processor 302 as described in connection with FIG. 3 below. For instance, the computing device or system 300 may represent any one or more components of a device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system (e.g., of a device deployed in and/or receiving a communication service from a communication network) determines that a temperature of the device exceeds a threshold temperature. In one example, the threshold temperature is set based upon historical temperature measurements of the device over a period of time. In one example, the threshold temperature may be set based upon historical temperature measurements of a plurality of devices of a same device type as the device over a period of time. In addition, in one example, the threshold temperature may be set in accordance with an ambient temperature around the device. For instance, step 210 may measure the difference between the device temperature and the surrounding temperature, and the threshold may similarly correspond to such a difference in temperatures. In one example, step 210 may comprise monitoring the temperature of the device during an after-hours time period of the device, where the after-hours time period is defined by an operator of the device.

At optional step 220, the processing system may determine that an electricity utilization of the device is in excess of an electricity utilization threshold. In one example, the electricity utilization threshold may be set based upon historical electricity measurements of the device over a period of time. In one example, the electricity utilization threshold may be set based upon historical electricity measurements of a plurality of devices of a same device type as the device over a period of time. In one example, optional step 220 may be performed during an after-hours time period (e.g., following step 210 and/or in conjunction with step 210).

At step 230, the processing system obtains utilization information of the device comprising: processor utilization information, memory utilization information, and network utilization information. In one example, the obtaining of the utilization information of the device may be performed in response to the determining that the temperature of the device exceeds the threshold temperature at step 210. In one example, step 230 may also be performed in response to determining that the electricity utilization of the device is in excess of the electricity utilization threshold at optional step 220.

At optional step 240, the processing system may determine, from the processor utilization information and the memory utilization information, that an overall processor utilization of the device is in excess of an overall processor utilization threshold, and that an overall memory utilization of the device is in excess of an overall memory utilization threshold. For instance, optional step 240 may comprise a first-stage screening via which the processing system may determine whether further investigation of possible unauthorized cryptomining should be pursued. In one example, the overall processor utilization threshold and the overall memory utilization threshold are determined in accordance with a machine learning model that is trained over historical utilization information of the device. In one example, the machine learning model may be further trained over historical utilization information of a plurality of devices of a same device type as the device.

At step 250, the processing system detects from the utilization information of the device a pattern comprising: a first network utilization burst, a processor utilization exceeding a processor utilization threshold and a memory utilization exceeding a memory utilization threshold over at least a designated period of time following the first network utilization burst, and a second network utilization burst after at least the designated period of time. In one example, step 250 may be performed in response to determining at optional step 240 that the overall processor utilization of the device is in excess of the overall processor utilization threshold and that the overall memory utilization of the device is in excess of the overall memory utilization threshold.

In one example, the pattern is detected for a particular process that is running on the device. For instance, the processing system may track utilization information on a per-process basis, and may detect that the utilization information matches the pattern for the particular process. In one example, the pattern may further comprise an absence of an input from the process within the designated period of time. For instance, as described above, an unauthorized cryptomining process may be initiated via a command form a remote device (e.g., along with information regarding one or more cryptographic puzzles to be solved) and may then run for several minutes, 30 minutes, up to one hour or more, etc. without additional input. The first and second network utilization "bursts" may have a defined small duration, e.g., within greater than zero to 30 seconds. Alternatively, or in addition, a burst may be defined to comprise a size/magnitude of network traffic (e.g., less than 10 MB) where all packets or other protocol data units of a communication with the remote device may be exchanged within a defined maximum latency within a session, e.g., each packet is sent and/or received within "X" ms of earlier or later packets of the session.

In one example, the processor utilization threshold is set based upon historical processor utilization measurements of the device, and the memory utilization threshold is set based upon historical memory utilization measurements of the device. In one example, the processor utilization threshold is set further based upon historical processor utilization measurements of additional devices of a same device type as the device, and the memory utilization threshold is set based upon historical memory utilization measurements of the additional devices. In one example, the processor utilization threshold and the memory utilization threshold may be determined in accordance with at least one machine learning model (MLM) that is trained over the historical utilization information of the device. For instance, separate MLMs may be developed for the processing utilization threshold and the memory utilization threshold, respectively. In another example, a MLM may account for both the processor utilization and the memory utilization. For instance, a MLM may comprise a decision tree, where leafs/nodes of the tree may include at least one node for the processor utilization and at least one node for the memory utilization, respectively.

In one example, the designated period of time may comprise at least 5 minutes. In another example, the designated period of time may comprise at least 10 minutes. In other words, the designated period of time may comprise a minimum duration of time threshold over which the processor utilization and memory utilization remain elevated in order to determine a pattern match. In other examples, the designated period of time may comprise a longer or shorter period of time. In one example, the processor utilization threshold may be with respect to a moving average of processor utilization (e.g., a 5 minute moving average, a 10 minute moving average, etc.). The time period of the moving average may the same as the designated time period or may be shorter. A moving average metric may similarly be applied with respect to the memory utilization threshold.

In addition, in one example, the designated period of time may be adjusted over time. For instance, unauthorized cryptomining applications may become more efficient to run for shorter periods of time, may run for shorter periods of time in an attempt to evade detection, may extend for longer periods of time as blockchain size increases, and so forth. In one example, the time period may be learned by the processing system via a machine learning module that tracks the time periods of cryptomining operations of one or more crypotmining application running on one or more devices. In one example, the machine learning module may be implemented via the processing system. In another example, the machine learning module may be implemented by another device (e.g., a server for an unauthorized cryptomining detection service) that may distribute patterns/signatures comprising processor utilization thresholds, memory utilization thresholds, and time durations (e.g., time thresholds) to various devices.

At optional step 260, the processing system may additionally detect a performance of at least one designated action by the process that is indicative of unauthorized cryptomining. For instance, optional step 260 may be performed in response to the detection of the pattern at step 250. The at least one designated action may comprise, for example, a number of hashing operations of the process that are in excess of a threshold number of hashing operations within the designated time period, a performance of at least one operation with respect to a distributed ledger, a request to reserve processor resources of the device in excess of a processor resource reservation threshold, a request to reserve memory resources of the device in excess of a memory resource reservation threshold, or a key exchange with a remote device within the first network utilization burst. Any one or more of these additional actions may provide a further verification that the pattern is associated with unauthorized cryptomining rather than another application or process that generates similar processor, memory, and network utilizations. It should be noted that the processing system may have permissions of the device to obtain detailed information regarding the operations executed by the process (and other processes) in order to perform optional step 260.

At step 270, the processing system generates an unauthorized cryptomining alert in response to detecting the pattern at step 250. In one example, the unauthorized cryptomining alert may further be generated in response to a detecting of the at least one designated action at optional step 260. The alert may be presented audible, visually, or both, via the device. In another example, the alert may comprise a message to one or more other devices.

At optional step 280, the processing system may transmit the unauthorized cryptomining alert to at least one monitoring device. In one example, optional step 280 may comprise transmitting the unauthorized cryptomining alert to a plurality of monitoring devices, where responses from at least two of the plurality of monitoring devices may be required to deactivate the unauthorized cryptomining alert Following step 270 or optional step 280 the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200 by detecting that the device temperature exceeds a threshold, obtaining new utilization information of the device, detecting the pattern, generating a new alert, and so on. In one example, the method 200 may also include obtaining historical utilization information, training one or more MLMs to develop the processor utilization threshold, the memory utilization threshold, the overall processor utilization threshold, and/or the overall memory utilization threshold, to develop the duration of time for the pattern detection, and so forth. In one example, the method 200 may also include scanning the device to detect miner executables, code signatures, or the like, which may indicate the cryptomining software is deployed on the device.

In another example, the method 200 may additionally include verifying that the process is not a whitelisted process and/or a scheduled process. For instance, legitimate processes may engage in operations which consume significant processor and memory resources, and which may also generate significant device heat. Accordingly, the method 200 may include verifying that the process is not authorized, prior to performing additional steps of the method 200 to confirm that unauthorized cryptomining is occurring. In still another example, the method 200 may be expanded to include verifying that the remote device is not an authorized remote device. For instance, an authorized device may remotely cause one or more applications or processes to engage in operations which consume significant processor and memory resources, and which may also generate significant device heat. Accordingly, the method 200 may include verifying that the remote device is not authorized, prior to performing additional steps of the method 200 to confirm that unauthorized cryptomining is occurring. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for generating an unauthorized cryptomining alert, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for generating an unauthorized cryptomining alert (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for generating an unauthorized cryptomining alert (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   determining, by a processing system of a device, that a temperature of the device exceeds a threshold temperature;
   obtaining, by the processing system in response to the determining, utilization information of the device comprising: processor utilization information, memory utilization information, and network utilization information;
   detecting, by the processing system in response to the obtaining, from the utilization information of the device, a pattern comprising: a first network utilization burst, a processor utilization exceeding a processor utilization threshold and a memory utilization exceeding a memory utilization threshold over at least a designated period of time following the first network utilization burst, and a second network utilization burst after at least the designated period of time; and
   generating, by the processing system, an unauthorized cryptomining alert in response to the detecting the pattern.

2. The method of claim 1, wherein the pattern is detected for a process that is running on the device.

3. The method of claim 2, wherein the pattern further comprises an absence of an input for the process within the designated period of time.

4. The method of claim 2, further comprising, in response to the detecting the pattern:
   detecting a performance of at least one designated action by the process that is indicative of unauthorized cryptomining, wherein the at least one designation action comprises at least one of:
   a number of hashing operations of the process that are in excess of a threshold number of hashing operations within the designated time period;
   a performance of at least one operation with respect to a distributed ledger;
   a request to reserve processor resources of the device in excess of a processor resource reservation threshold;
   a request to reserve memory resources of the device in excess of a memory resource reservation threshold; or
   a key exchange with a remote device within the first network utilization burst.

5. The method of claim 4, wherein the generating of the unauthorized cryptomining alert is in accordance with the detecting of the at least one designated action.

6. The method of claim 1, further comprising:
   transmitting the unauthorized cryptomining alert to at least one monitoring device.

7. The method of claim 6, wherein the unauthorized cryptomining alert is transmitted to a plurality of monitoring devices, wherein responses from at least two of the plurality of monitoring devices are required to deactivate the unauthorized cryptomining alert.

8. The method of claim 1, wherein the threshold temperature is set based upon historical temperature measurements of the device over a period of time.

9. The method of claim 1, wherein the threshold temperature is set in accordance with an ambient temperature around the device.

10. The method of claim 1, wherein the processor utilization threshold is set based upon historical utilization information comprising historical processor utilization measurements of the device, and the memory utilization threshold is set based upon the historical utilization information comprising historical memory utilization measurements of the device.

11. The method of claim 10, wherein the processor utilization threshold is set further based upon historical processor utilization measurements of additional devices of a same device type as the device, and the memory utilization threshold is set based upon historical memory utilization measurements of the additional devices.

12. The method of claim 10, wherein the processor utilization threshold and the memory utilization threshold are determined in accordance with at least one machine learning model that is trained over the historical utilization information of the device.

13. The method of claim 1, wherein the determining that the temperature of the device exceeds the threshold temperature comprises monitoring the temperature of the device during an after-hours time period of the device, wherein the after-hours time period is defined by an operator of the device.

14. The method of claim 1, wherein the designated period of time comprises at least 5 minutes.

15. The method of claim 14, wherein the designated period of time comprises at least 10 minutes.

16. The method of claim 1, further comprising:
   determining, from the processor utilization information and the memory utilization information, that an overall processor utilization of the device is in excess of an overall processor utilization threshold, and that an overall memory utilization of the device is in excess of an overall memory utilization threshold, wherein the detecting the pattern is performed in response to determining that the overall processor utilization of the device is in excess of the overall processor utilization threshold and that the overall memory utilization of the device is in excess of the overall memory utilization threshold.

17. The method of claim 16, wherein the overall processor utilization threshold and the overall memory utilization threshold are determined in accordance with a machine learning model that is trained over historical utilization information of the device.

18. The method of claim 1, further comprising:
   determining that an electricity utilization of the device is in excess of an electricity utilization threshold, wherein the utilization information is obtained further in response to the determining that the electricity utilization of the device is in excess of the electricity utilization threshold.

19. A non-transitory computer-readable medium storing instructions which, when executed by a processing system of a device including at least one processor, cause the processing system to perform operations, the operations comprising:
   determining that a temperature of the device exceeds a threshold temperature;
   obtaining, in response to the determining, utilization information of the device comprising: processor utilization information, memory utilization information, and network utilization information;
   detecting, in response to the obtaining, from the utilization information of the device, a pattern comprising: a first network utilization burst, a processor utilization exceeding a processor utilization threshold and a memory utilization exceeding a memory utilization threshold over at least a designated period of time following the first network utilization burst, and a second network utilization burst after at least the designated period of time; and
   generating an unauthorized cryptomining alert in response to the detecting the pattern.

20. A device comprising:
a processing system including at least one processor; and
a computer-readable medium storing instructions which, when executed by the processing system, cause the processing system to perform operations, the operations comprising:
   determining that a temperature of the device exceeds a threshold temperature;
   obtaining, in response to the determining, utilization information of the device comprising: processor utilization information, memory utilization information, and network utilization information;
   detecting, in response to the obtaining, from the utilization information of the device, a pattern comprising: a first network utilization burst, a processor utilization exceeding a processor utilization threshold and a memory utilization exceeding a memory utilization threshold over at least a designated period of time following the first network utilization burst, and a second network utilization burst after at least the designated period of time; and
   generating an unauthorized cryptomining alert in response to the detecting the pattern.

* * * * *